(12) United States Patent
Okada et al.

(10) Patent No.: US 7,898,437 B2
(45) Date of Patent: Mar. 1, 2011

(54) OBJECT RECOGNITION DEVICE

(75) Inventors: Kiyokazu Okada, Nishikamo-gun (JP);
Motohiro Nakamura, Okazaki (JP);
Masaki Nakamura, Oakazaki (JP);
Makoto Hasunuma, Nagoya (JP)

(73) Assignees: Toyota Jidosha Kabushiki Kaisha,
Toyota-shi (JP); Aisin AW Co., Ltd.,
Anjyo-shi (JP)

( * ) Notice: Subject to any disclaimer, the term of this patent is extended or adjusted under 35 U.S.C. 154(b) by 407 days.

(21) Appl. No.: 12/067,100

(22) PCT Filed: May 15, 2007

(86) PCT No.: PCT/JP2007/059979

§ 371 (c)(1),
(2), (4) Date: Mar. 17, 2008

(87) PCT Pub. No.: WO2007/132860

PCT Pub. Date: Nov. 22, 2007

(65) Prior Publication Data

US 2010/0061591 A1 Mar. 11, 2010

(30) Foreign Application Priority Data

May 17, 2006 (JP) .............................. 2006-138256

(51) Int. Cl.
*G08G 1/123* (2006.01)

(52) U.S. Cl. .................. 340/995.25; 340/436; 340/988; 382/103; 382/104; 382/154; 382/190; 701/200; 701/207; 701/208

(58) Field of Classification Search ............ 340/995.25, 340/990, 988, 995.14, 903, 436, 995.24, 340/435; 382/103, 104, 154, 190; 701/212, 701/35, 221, 200, 207, 208
See application file for complete search history.

(56) References Cited

U.S. PATENT DOCUMENTS

| | | | | |
|---|---|---|---|---|
| 5,469,360 A | * | 11/1995 | Ihara et al. | ................ 701/208 |
| 5,552,990 A | * | 9/1996 | Ihara et al. | ................ 701/208 |
| 5,638,116 A | * | 6/1997 | Shimoura et al. | ........... 348/118 |
| 6,018,697 A | * | 1/2000 | Morimoto et al. | ........... 701/209 |

(Continued)

FOREIGN PATENT DOCUMENTS

JP        11 37776        2/1999

(Continued)

*Primary Examiner*—George A Bugg
*Assistant Examiner*—Hoi C Lau
(74) *Attorney, Agent, or Firm*—Oblon, Spivak, McClelland, Maier & Neustadt, L.L.P.

(57) ABSTRACT

An object recognition device detects a position of a vehicle based on a running path obtained by GPS, vehicle speed, steering angle, etc., and also detects the position of the vehicle based on a result of recognition of an object obtained using a captured image of a camera. The device computes a positioning accuracy in detecting the vehicle position, which accuracy mostly deteriorates as a movement distance of the vehicle increases. Positional data of the object on the road to be recognized is stored in a map database beforehand. A recognition range of the road of the object to be recognized is set based on the detected position of the vehicle, a position of the object stored in the map database, and the computed positioning accuracy. The object is recognized for the set recognition range by processing of the captured image of the camera.

7 Claims, 6 Drawing Sheets

U.S. PATENT DOCUMENTS

| | | | |
|---|---|---|---|
| 6,438,491 B1* | 8/2002 | Farmer | 701/301 |
| 6,560,529 B1* | 5/2003 | Janssen | 701/200 |
| 6,567,746 B2* | 5/2003 | Kuroda et al. | 701/212 |
| 6,661,449 B1* | 12/2003 | Sogawa | 348/113 |
| 6,832,156 B2* | 12/2004 | Farmer | 701/301 |
| 6,853,906 B1* | 2/2005 | Michi et al. | 701/207 |
| 6,891,960 B2* | 5/2005 | Retterath et al. | 382/104 |
| 6,927,699 B2* | 8/2005 | Samukawa et al. | 340/903 |
| 7,031,496 B2* | 4/2006 | Shimano et al. | 382/104 |
| 7,451,041 B2* | 11/2008 | Laumeyer et al. | 701/209 |
| 7,486,802 B2* | 2/2009 | Hougen | 382/104 |
| 7,584,047 B2* | 9/2009 | Igarashi et al. | 701/208 |
| 2002/0001398 A1* | 1/2002 | Shimano et al. | 382/104 |
| 2002/0106109 A1* | 8/2002 | Retterath et al. | 382/104 |
| 2002/0169548 A1* | 11/2002 | Kuroda et al. | 701/212 |
| 2003/0004644 A1* | 1/2003 | Farmer | 701/301 |
| 2004/0030493 A1* | 2/2004 | Pechatnikov et al. | 701/208 |
| 2004/0044477 A1* | 3/2004 | Jung et al. | 702/5 |
| 2004/0158390 A1* | 8/2004 | Mukaiyama | 701/200 |
| 2004/0267452 A1* | 12/2004 | Igarashi et al. | 701/300 |
| 2005/0149251 A1* | 7/2005 | Donath et al. | 701/200 |
| 2006/0195258 A1* | 8/2006 | Kim et al. | 701/211 |
| 2006/0233424 A1* | 10/2006 | Miyajima et al. | 382/104 |
| 2007/0055441 A1* | 3/2007 | Retterath et al. | 701/200 |
| 2007/0124071 A1* | 5/2007 | Joo et al. | 701/211 |
| 2007/0233380 A1* | 10/2007 | Tanaka | 701/211 |
| 2008/0243378 A1* | 10/2008 | Zavoli | 701/209 |
| 2008/0273757 A1* | 11/2008 | Nakamura et al. | 382/104 |
| 2009/0228204 A1* | 9/2009 | Zavoli et al. | 701/208 |
| 2009/0252376 A1* | 10/2009 | Retterath et al. | 382/104 |

FOREIGN PATENT DOCUMENTS

| | | |
|---|---|---|
| JP | 2000 346653 | 12/2000 |
| JP | 2003 12397 | 1/2003 |
| JP | 2003 123197 | 4/2003 |
| JP | 2005 17054 | 1/2005 |
| JP | 2005 25497 | 1/2005 |
| JP | 2005 170154 | 6/2005 |
| JP | 2005 265494 | 9/2005 |

* cited by examiner

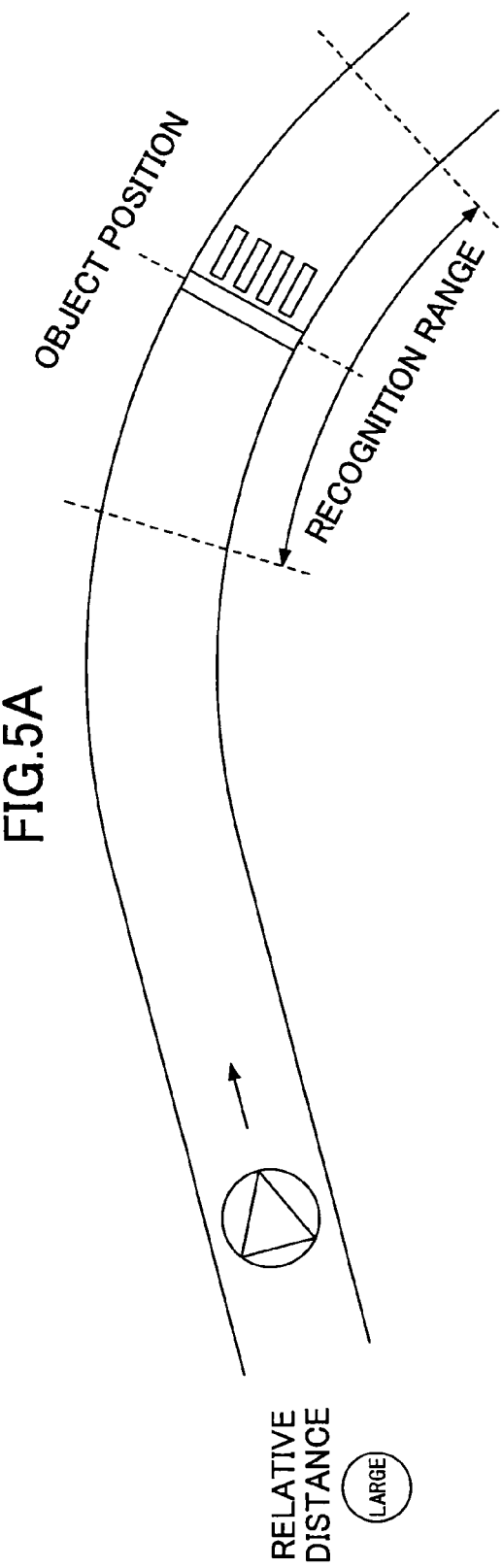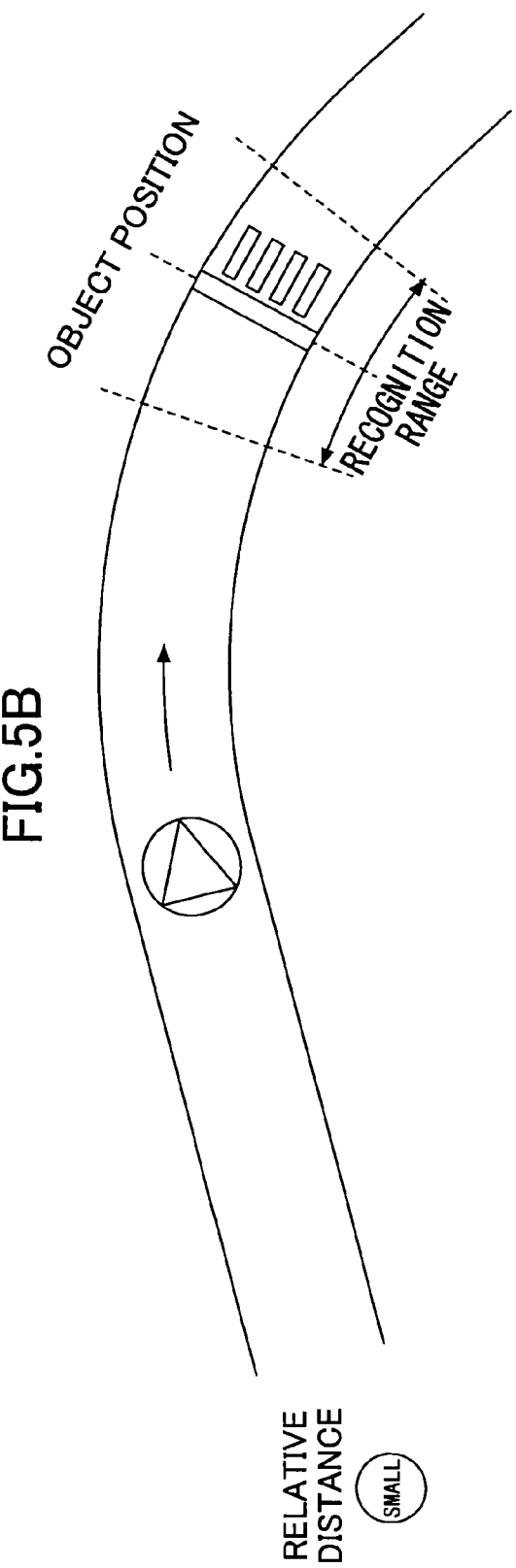

FIG.6

| RECOGNITION RANGE | | RELATIVE DISTANCE | |
|---|---|---|---|
| POSITIONING ACCURACY | HIGH ↕ LOW | SMALL ⟵⟶ LARGE | |
| | | NARROW ↖ | |
| | | ↘ WIDE | |

OBJECT RECOGNITION DEVICE

TECHNICAL FIELD

This invention generally relates to an object recognition device, and more particularly to an object recognition device which is appropriate for use in an automotive vehicle in recognizing an object on a road.

BACKGROUND ART

Conventionally, there is known an object recognition device for use in an automotive vehicle which is a mobile unit, and this object recognition device recognizes a stationary object, such as a road sign. For example, see Japanese Laid-Open Patent Application No. 2000-246653. In this object recognition device, a camera is provided to capture an image of a road in a circumference of the vehicle and a stationary object on the road is recognized based on the image information captured by the camera.

DISCLOSURE OF THE INVENTION

The Problem to be Solved by the Invention

As mentioned above, stationary objects recognized based on a captured image of the camera may include road signs and road surface indications which are installed or drawn on the road, and they are scattered on the road. In many cases, the position of a stationary object is absolutely defined or defined relatively to a fixed object on a map, such as a crossing.

In recognizing an object on a road by the vehicle having a map database in which the positional information of stationary objects to be recognized is stored beforehand, if an image of the road must be invariably captured by the camera and the captured image must be processed, the load for the recognition processing increases. Consequently, the problem that much time must be taken for recognition of an object on a road, or the problem that an expensive device for enabling high speed processing is required will arise.

According to one aspect of the invention, there is disclosed an improved object recognition device in which the above-mentioned problems are eliminated.

According to one aspect of the invention, there is disclosed an object recognition device which is capable of reducing the load for recognition processing of an object on a road.

Means for Solving the Problem

In an embodiment of the invention which solves or reduces one or more of the above-mentioned problems, there is disclosed an object recognition device of an automotive vehicle, the object recognition device comprising: a positioning part detecting a position of the vehicle in accordance with a predetermined method; a positioning-accuracy computing part computing a positioning accuracy in detecting a position of the vehicle; a storing part storing beforehand positional information of an object on a road to be recognized by the vehicle; a recognition-range setting part setting a recognition range of the road of the object to be recognized, based on the position of the vehicle detected by the positioning part, a position of the object stored by the storing part, and the positioning accuracy computed by the positioning accuracy computing part; and an object recognition part recognizing the object for the recognition range set by the recognition-range setting part.

In this embodiment, a recognition range of a road ahead of a vehicle is set based on the position of the vehicle, the position of an object, and the positioning accuracy when positioning the position of the vehicle. And recognition processing of the object is performed for the set recognition range. In this composition, recognition processing of the object is not performed for other than the set recognition range. For this reason, according to this embodiment of the invention, the processing load needed for recognition of an object can be remarkably reduced from that needed in the composition in which recognition processing of an object is invariably performed.

The positional information of an object is beforehand stored in the storing part and it is accurate to some extent. The position of the vehicle is detected according to the predetermined method, and the detected position of the vehicle has an error according to the positioning accuracy. If a positioning error does not arise, performing recognition processing of the object when the detected position of the vehicle agrees with the position of the object is enough. However, in practice, a positioning error arises. If recognition processing of the object is performed when the detected position of the vehicle agrees with the position of the object, there is a possibility that the vehicle already passes by the object at the time of performing the recognition processing of the object, which makes recognition of the object impossible. To obviate the problem, in the above-mentioned embodiment, the recognition range is set by taking into consideration the positioning accuracy at the vehicle position, and it is possible to prevent occurrence of the inoperable state of recognition of the object.

The recognition range of a positioning error of a vehicle position becomes narrow when a level of positioning accuracy is high, while the recognition range of a positioning error of a vehicle position becomes wide when a level of positioning accuracy is low. Therefore, the above-mentioned object recognition device may be configured so that the recognition-range setting part is arranged to set a wider recognition range as a level of the positioning accuracy computed by the positioning accuracy computing part decreases.

The recognition range of a positioning error becomes wide and the positioning accuracy becomes low as the relative distance of the vehicle and the object increases when a position of a vehicle is detected based on a running path of the vehicle according to vehicle speed, steering angle, etc. Therefore, the above-mentioned object recognition device may be configured so that the recognition-range setting part is arranged to set a wider recognition range as a distance from the position of the vehicle detected by the positioning part to the position of the object stored by the storing part increases.

The above-mentioned object recognition device may be configured so that, when the object is recognized for the recognition range by the object recognition part, the positioning part adjusts the detected position of the vehicle obtained from GPS or a running path of the vehicle, based on a recognition result from the object recognition part.

The above-mentioned object recognition device may be configured so that the positioning-accuracy computing part is arranged so that a level of the positioning accuracy, computed at a time of adjusting of the detected position of the vehicle by the positioning part based on the recognition result of the object, decreases in accordance with an increase of a movement distance of the vehicle.

The above-mentioned object recognition device may be configured to further comprise a recognized object setting part which sets, as an object to be recognized, a specific object from among all objects positional information of which is stored in the storing part which exists on a running path of the vehicle, wherein the object recognition part is arranged to recognize only the specific object that is set by the recognized object setting part.

The above-mentioned object recognition device may be configured to further comprise a recognized object setting part wherein, when a support control part which performs support control of the vehicle according to a position of the vehicle requests the object recognition device to meet a required positioning accuracy during execution of the support control, the recognized object setting part sets, as an object to be recognized, a specific object from among all objects positional information of which is stored in the storing part, which specific object exists on a running path of the vehicle in which adjusting of the detected position of the vehicle by the positioning part based on the recognition result allows the positioning accuracy required by the support control part to be met during execution of the support control, wherein the object recognition part is arranged to recognize only the specific object that is set by the recognized object setting part.

The above-mentioned object recognition device may be configured so that the object recognition part recognizes the object using image information obtained from an image of the recognition range set by the recognition-range setting part, which image is captured by an imaging part arranged in a predetermined position of the vehicle.

Effects of the Invention

According to the embodiments of the object recognition device of the invention, it is possible to reduce remarkably the load for recognition processing of an object on a road in a circumference of a vehicle.

BRIEF DESCRIPTION OF THE DRAWINGS

FIG. 5A and FIG. 5B are diagrams for explaining a method of setting a recognition range of a road according to the relative distance between the vehicle and the object which may be implemented in the object recognition system of this embodiment.

FIG. 6 is a diagram showing a map used when setting a recognition range of a road by the object recognition system of this embodiment.

Figure 1:
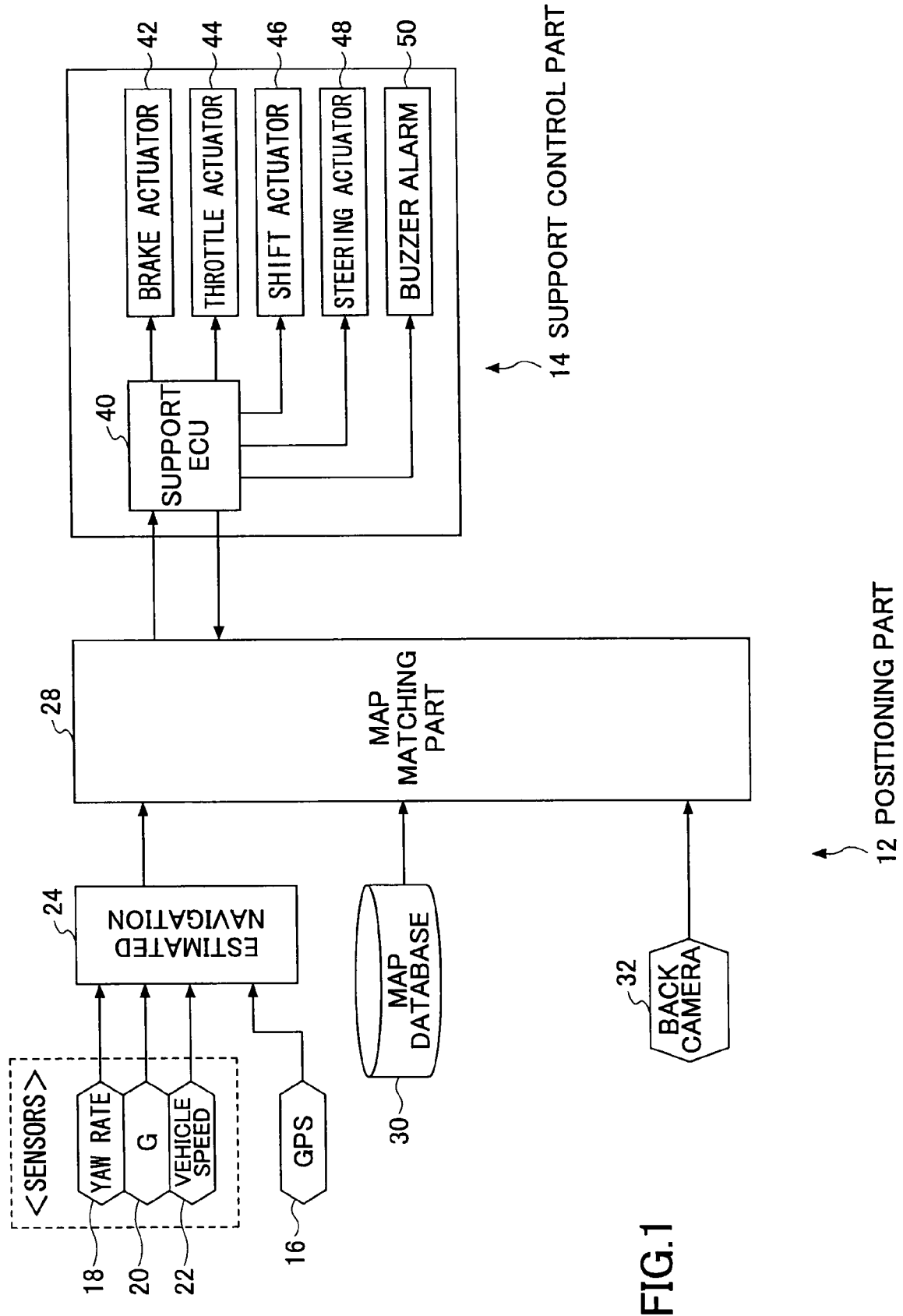
FIG. 1 is a diagram showing the composition of an object recognition system provided in an automotive vehicle, which is an embodiment of the invention.

DESCRIPTION OF REFERENCE NUMERALS 12 positioning part
14 support control part
16 GPS receiver
18 direction sensor
20 G sensor
22 vehicle speed sensor
24 estimated navigation part
28 map matching part
30 map database
32 back camera

BEST MODE FOR CARRYING OUT THE INVENTION

A description will be given of preferred embodiments of the invention with reference to the accompanying drawings.

FIG. 1 shows the composition of an object recognition system provided in an automotive vehicle which is one embodiment of the invention. As shown in FIG. 1, the object recognition system of this embodiment includes a positioning part 12 which detects a position of the vehicle, and a support control part 14 which controls running of the vehicle. In this object recognition system, a position of the vehicle is detected by the positioning part 12, and a predetermined support control in support for running of the vehicle is performed by the support control part 14 in accordance with the detected position of the vehicle.

The positioning part 12 includes a GPS (global positioning system) receiver 16 which receives a GPS signal from a GPS satellite so that a latitude and a longitude of the vehicle position where the vehicle exists are detected. A direction sensor 18 detects a yaw angle (direction) of the vehicle by using a vehicle turning angle or earth magnetism. A G sensor 20 detects a quantity of acceleration or deceleration of the vehicle. A vehicle speed sensor 22 detects a running speed of the vehicle.

The positioning part 12 further includes an estimated navigation part 24 having inputs to which respective outputs of the receiver 16 and the sensors 18-22 are connected. The estimated navigation part 24 is mainly constituted by a microcomputer. The output signals of the receiver and sensors 16-22 are supplied to the inputs of the estimated navigation part 24, respectively. The estimated navigation part 24 detects the latitude and the longitude (initial coordinates) of the position of the vehicle based on the information from the GPS receiver 16. And the estimated navigation part 24 detects running conditions of the vehicle, including a traveling direction, a vehicle speed, and a quantity of acceleration or deceleration, based on the information from the sensors 18-22, and generates a running path (estimated path) of the vehicle from the initial coordinates of the vehicle position.

The positioning part 12 further includes a map matching part 28 having an input connected to the output of the estimated navigation part 24. The map matching part 28 is mainly constituted by a microcomputer. A map database 30 is connected to an input of the map matching part 28. The map database 28 is constituted by a hard disk drive (HDD) which may be arranged in the vehicle or in the center, or by a recording medium, such as DVD, CD, etc. In the map database 28, positional information of stationary objects drawn or installed on road surface, link data of roads required for course guidance or map display indication, lanes, etc. is stored.

Specifically, the positional information stored in the map database 30 contains the data of latitude/longitude and curvature expressing each road, the lane shape of slope, the number of lanes, lane width and corner existence, the road classification, the information about each crossing or node point, the information about buildings, etc. for performing a map display. Moreover, the positional information stored in the map database 30 contains, for each of stationary objects, drawn on road surface, including a pedestrian crossing, a pedestrian crossing indication, a stop line, a direction-of-movement arrow, a full speed indication, and a turning prohibition indication, shape data, paint data, positional data, a feature amount, distance data from another object in proximity, the data indicating the degree of ease of rubbing, distance data from a target object in a vehicle traveling direction, etc. This map database 30 can be updated to the newest version of the map data at a time of exchange of the recording medium or when the updating conditions are satisfied.

The information including the initial coordinates of the vehicle position and the estimated path from the initial coordinates, detected and generated by the estimated navigation part 24, is supplied to the map matching part 28. The map matching part 28 performs map matching (a first map matching) based on the initial coordinates of the vehicle position and the estimated path received from the estimated navigation part 24. In this first map matching, the position of the vehicle is adjusted on the road link using the link information of the road stored in the map database 30. The map matching part 28 computes a level of positioning accuracy which indicates a level of accuracy of the vehicle position detected as a result of the first map matching.

The map matching part 28 reads from the map database 30 the data of an object which is located on the road surface in a predetermined range from the current position of the vehicle obtained as the result of the first map matching, and sets, as a target object to be recognized, the object existing in the predetermined range from the current vehicle position. Subsequently, after the target object is set, based on the vehicle position which is detected by the positioning part 12, the map matching part 28 determines whether the set object is to be recognized using a captured image of a back camera 32 which will be described below.

The positioning part 12 includes a back camera 32 having an output connected to an input of the map matching part 28. For example, the back camera 32 is arranged in the rear bumper of the vehicle or the like, and this back camera 32 captures an image of the vehicle outside in a predetermined area from its arranged position, which image contains the road surface at the rear of the vehicle. The captured image of the back camera 32 is supplied to the map matching part 28.

If it is determined that recognition of a captured image of the back camera 32 is to be performed, the map matching part 28 performs image processing of the captured image, such as edge extraction, when it receives the captured image from the back camera 32, so that the above-mentioned objects drawn on road surface and the running lane are detected and the relative positional relationship between the vehicle and the objects or the running lane is grasped.

The map matching part 28 computes a position of the running lane to the vehicle on the road on which the vehicle is actually running, based on the detection result of the running lane obtained from the captured image of the back camera 32.

Based on the detection result of the objects, the map matching part 28 measures a relative relationship between the vehicle and a recognized object on the road behind the vehicle (for example, a distance from the vehicle to the recognized object). And based on the measurement result and the positional data of the recognized object stored in the map database 30, the map matching part 28 performs map matching (a second map matching) in which the position of the vehicle (or the position of the vehicle in its fore-and-aft direction) is adjusted to a position which matches with the relative relationship to the recognized object.

In this manner, each time the information of an estimated path is received from the estimated navigation part 24, the map matching part 28 performs the first map matching in which the current position of the vehicle is adjusted on the road link stored in the map database 30. And each time an object to be recognized is recognized from the captured image of the back camera 32, the map matching part 28 performs the second map matching in which the position of the vehicle is adjusted to the position based on the recognized object obtained from the recognition result.

The map matching part 28 computes a level of the positioning accuracy which indicates a level of accuracy (or a degree of confidence) of the current position of the vehicle which is detected as a result of the above-mentioned map matching.

Moreover, the map matching part 28 checks the position of the vehicle detected by the map matching in conjunction with the map data stored in the map database 30. When a target object (for example, a stop line, a crossing, a curve admission point, etc.) which is a controlled system required to perform the support control exists in a predetermined range of the road ahead in the movement direction of the vehicle, the map matching part 28 subsequently computes a distance (which will be called the remaining distance along the path) in alignment with the centerline of the running lane from the vehicle to the target object ahead in the movement direction of the vehicle, based on the relationship between the detected position of the vehicle and the position of the target object stored in the map database 30, each time the positioning is performed by the positioning part 12.

The positioning part 12 and the support control part 14 are interconnected. The information on the position of the vehicle and the remaining distance obtained by the positioning detection by the positioning part 12 is supplied to a display unit, which is arranged in the passenger compartment of the vehicle and can be visually recognized by the passenger, so that a diagrammatic indication of the supplied information is superimposed to a display indication of the road map on the display screen. At the same time, the information is supplied from the positioning part 12 to the support control part 14.

The support control part 14 includes an electronic control unit (called support ECU) 40 which is mainly constituted by a microcomputer. The support ECU 40 performs support control for supporting operation of a driver who maneuvers the vehicle while running on a road.

The support control is performed according to the position of the vehicle. Specifically, the support control is performed according to the remaining distance along the path from the vehicle to a target object. An example of the support control is a stop control which is operation support control for stopping the vehicle behind a stop line or a crossing line (which is a target object on a road) when brake operation by the driver is not performed or when braking operation by the driver is delayed. Other examples of the support control may include a crossing control which is operation support control for avoiding the vehicle from crashing against another vehicle which is predicted to intersect with the vehicle at a crossing (which is a target object on a road), a speed control for making the vehicle run at a suitable speed at a curve (or a corner) (which is a target object), a guidance control for performing course guidance by voice concerning the relative distance of the vehicle to a target object, etc.

As shown in FIG. 1, a brake actuator 42 for generating a suitable braking force on the vehicle, a throttle actuator 44 for assigning a suitable driving force for the vehicle, a shift actuator 46 for changing the gear ratio of an automatic transmission of the vehicle, a steering actuator 48 for assigning a suitable steering angle for the vehicle, and a buzzer alarm 50 for performing buzzer sounding or alarm output and a loudspeaker output to the inside of the passenger compartment are connected to the support ECU 40.

The support ECU 40 outputs a suitable drive command to each of the actuators 42-50, based on the position of the vehicle detected by the positioning part 12, and the relative relation between the vehicle and the target object, in order to carry out the above-mentioned support control. Each of the actuators 42-50 is driven according to the drive command supplied from the support ECU 40.

Next, operation of the object recognition system of this embodiment will be explained.

When a vehicle driver desires execution of the support control by the support control part 14, the driver operates the object recognition system of this embodiment so that the object recognition system is in an operable state. In the object recognition system of this embodiment, the estimated navigation part 24 of the positioning part 12 generates a running path from the initial coordinates of the vehicle position based on the output signals of the receiver and sensors 16-22 at intervals of a predetermined time.

The map matching part 28 checks the initial-coordinate position and the estimated path of the vehicle from the estimated navigation part 24 with the link information of the road stored in the map database 30 as the map data, and performs the first map matching in which the position of the vehicle is adjusted on the road link.

When the vehicle position is detected, the map matching part 28 displays the vehicle position, superimposed in the road map, on the display screen of the display unit which can be visually recognized by the passenger, and reads, from the map database 30, the data of objects in the road range (if two or more lanes exist, the data of objects in all the lanes) from the vehicle position to an expected position of the vehicle which it will reach as a result of running for a predetermined time or by a predetermined distance, or to a position of a target object (which is a controlled system of support control).

And the map matching part 28 sets the object in the predetermined road range as an object to be recognized using the back camera 32. After that, the map matching part 28 determines whether the vehicle position reaches near the position of the object to be recognized, based on the position of the set object to be recognized and the position of the vehicle invariably updated (which will be described later). When the position of the object to be recognized is reached, the map matching part 28 determines whether the set object is to be recognized through the image processing of the captured image of the back camera 32.

When it is determined that the set object is to be recognized as a result of the above-mentioned determination, the map matching part 28 performs the image processing of the captured image, such as edge extraction, by receiving the captured image of the vehicle back from the back camera 32.

And by comparing the results of the image processing with the characteristic data of the set object to be recognized, such as form data and positional data, the map matching part 28 determines whether the set object is recognized by the image processing.

When the set object to be recognized is actually recognized, the map matching part 28 detects the relative position and distance of the vehicle to the recognized object which exists behind the vehicle, based on the relative relationship between the vehicle and the recognized object specified by the image processing, and accesses the map database 30 to read out the positional data of the recognized object from the map database 30.

And based on the relative distance to the recognized object and the positional data of the recognized object, the map matching part 28 performs the second map matching in which the position of the vehicle (or the position of the vehicle in the fore-and-aft direction) is adjusted to a position which matches with the detected relative relationship to the position of the recognized object.

When the above-mentioned second map matching is performed, the map matching part 28 accesses the map database 30 to acquire the distance from the recognized object to the target object (which is the object of support control) on the running road, and computes the initial value of the remaining distance from the vehicle to the target object along the path, based on the position of the vehicle and the distance from the recognized object to the target object.

When the object to be recognized within the predetermined road range is recognized, the map matching part 28 acquires and recognizes the information of the running lane on the road by performing the image processing of the captured image of the back camera 32, and grasps the relative relation of the running lane to the vehicle. And the map matching part 28 access the map database 30 to acquire the lane width, the number of lanes, the shape, etc. of the running lane in the vicinity of the vehicle position. Based on the relative relationship of the running lane to the vehicle and the number of lanes and others acquired from the map database 30, the map matching part 28 determines the position of the lane in which the vehicle is currently running on the road.

The target object may differ for every running lane. However, if the position of the lane in which the vehicle is currently running is concretely specified as mentioned above, the target object ahead of the vehicle in its movement direction which exists in the determined lane is determined. Thus, it is possible to compute the above-mentioned remaining distance along the path on the basis of the target object in the determined lane.

As described above, at intervals of the predetermined time, the estimated navigation part 24 generates an estimated path of the vehicle position using the GPS receiver 16 and the sensors 18-22, and transmits the estimated path information to the map matching part 28.

After the second map matching is performed together with the object recognition as mentioned above, each time it receives the estimated path information from the estimated navigation part 24, the map matching part 28 computes the position of the vehicle (or the distance in the fore-and-aft direction of the vehicle) to the position of the coordinates of the recognized object on the centerline of the lane in which the vehicle is running based on the estimated path from the point where the second map matching is performed and the position of the lane in which the vehicle is running.

And based on the distance in the fore-and-aft direction of the vehicle and the distance between the recognized object and the target object in the determined lane, the map matching part 28 computes the remaining distance from the current position of the vehicle to the target object along the path.

The information of the computed remaining distance and the information of the vehicle position detected by the positioning part 12 are supplied to the display unit, and at the same time they are supplied to the support control part 14. Graphical indications of the vehicle position and the remaining distance, superimposed on the road map, are displayed on the display screen of the display unit in accordance with the information received from the positioning part 12.

The support ECU 40 of the support control part 14 determines whether the control start condition provided for the support control concerned is satisfied, for every support control, based on the distance on the running road to the target object (which is a controlled system of the support control), such as a stop line or a crossing, supplied from the positioning part 12. When the control start condition is satisfied, the support control is started.

For example, in a case of a stop line control, when the distance from the detected position of the vehicle to the stop line (which is a target object) is equal to 30 m (which may change according to the vehicle speed), execution of automatic braking by the brake actuator 42 is started. Thereby, the vehicle is stopped prior to the stop line. In this case, before starting the automatic braking by the brake actuator 42, voice guidance which informs the driver that the automatic braking is about to be performed.

In a case of a course guidance control by voice, when the distance from the detected position of the vehicle to the crossing (which is a target object) is equal to, for example, 100 m, execution of course guidance which informs the driver that the target object exists ahead of the vehicle is performed by the loudspeaker output by the buzzer alarm 50.

Thus, in the object recognition system of this embodiment, based on the estimated path using the outputs of the GPS receiver 16 and the sensors 18-22 in the positioning part 12, the position of the vehicle can be positioned on the road link of the map data stored in the map database 30. The object drawn or installed on road surface can be recognized through the image processing of the captured image of the back camera 32. And based on the positional information of the recognized object stored beforehand in the map database 30 and the relative relationship between the vehicle position and the position of the recognized object, the position of the vehicle can be detected.

The GPS receiver 16, the direction sensor 18, the G sensor 20, the vehicle speed sensor 22, and the back camera 32 are used for the detection of the position of the vehicle and the computation of the remaining distance from the position of vehicle to the position of the target object along the path.

Figure 2:
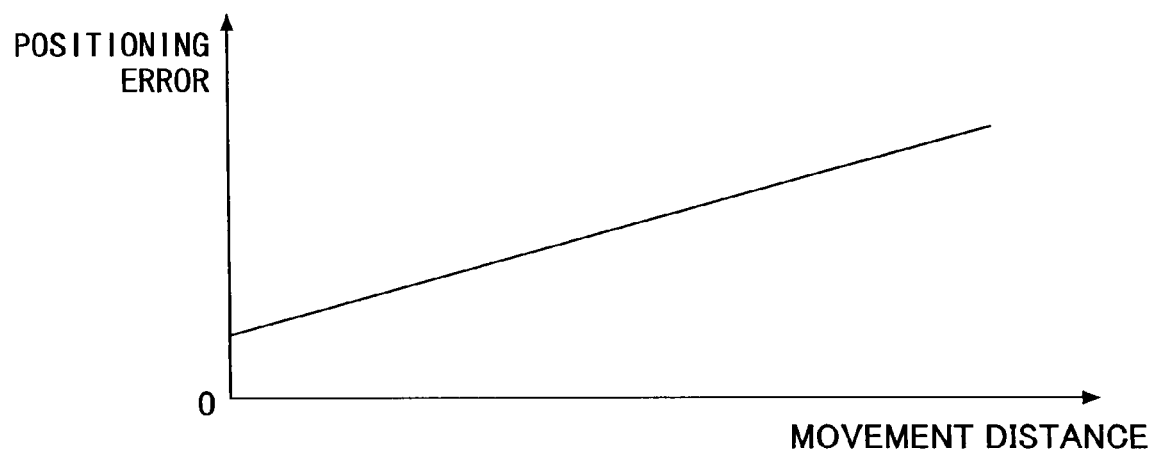
FIG. 2 is a diagram showing the relationship between a vehicle movement distance and a positioning error.

However, in the detection and computation, the errors of the detection parameters in the receiver 16, the sensors 16-22 and the camera 32, and the errors (for example, timing rounding error) included in the computations at the time of positioning, arise, and a positioning error occurs in the detection result of the vehicle position. Since this positioning error is accumulated with movement of the vehicle, the error in detecting the vehicle position becomes large as the movement distance of the vehicle increased, and the resulting positioning accuracy falls (refer to FIG. 2).

On the other hand, the positional information of the object stored in the map database 30 has a high accuracy. If the positional information of the object stored in the map database 30 is used, the positioning error in detecting the vehicle position becomes small, and the resulting positioning accuracy becomes high.

Therefore, the detection of the vehicle position is performed according to the above-described method in the object recognition system of this embodiment. Specifically, the first map matching is performed based on the estimated path of the vehicle using the GPS or sensor outputs, and the second map matching is performed based on the recognition result at the time of recognition of the object using the captured image of the camera.

The positioning accuracy of the vehicle position falls as the movement of the vehicle increases, before the object drawn or installed on road surface is recognized by using the captured image of the back camera 32, However, each time the object is recognized, the positioning accuracy of the vehicle position can be raised.

In the object recognition system of this embodiment, support control can be performed according to the vehicle position detected by the positioning part 12 (or according to the distance from the vehicle to a target object which is an object of the support control).

Before the predetermined relative positional relationship between the vehicle and the target object as a result of positioning is not reached, the support control is not performed. But the support control can be performed as soon as the relative positional relationship is reached. For this reason, according to the object recognition system of this embodiment, any of the support control operations of the driver for making the vehicle run on the road, including the stop line control, the crossing control, the vehicle speed control, and the guidance control, can be performed in accordance with the positioning result of the vehicle, and it is possible to maintain running of the vehicle on the road appropriately and safely.

In the above-mentioned embodiment, the object on the road is recognized through image processing of the captured image of the back camera 32 in order to adjust the vehicle position. The object being recognized may be any of a stop line, a pedestrian crossing, an arrow, a turning inhibition, a lozenge indication, a character string, a slowdown area, etc. and these objects are scattered on the road. It is not necessary to perform invariably the object recognition processing.

The positional information of the object to be recognized is stored beforehand in the map database 30, and the stored positional information has a high level of positioning accuracy to some extent. Since the position of the vehicle is detected according to the above-mentioned positioning method, an error according to the positioning accuracy arises in the detection result.

If any positioning error of the vehicle position does not arise, the recognition processing of the object using the captured image of the camera may be performed when the detected position of the vehicle matches with the position of the object stored in the map database 30 or when the detected vehicle position reaches the vicinity of the stored position of the object.

Figure 3:
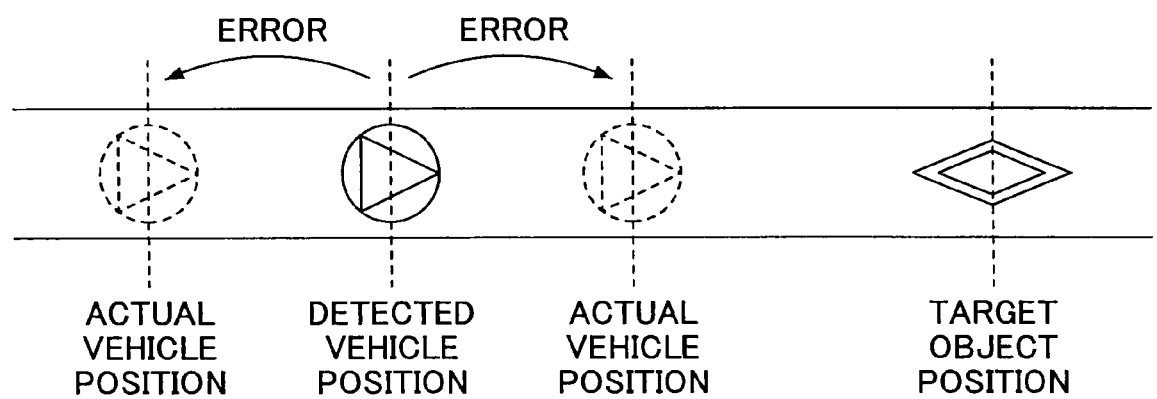
FIG. 3 is a diagram for explaining an error between a detected vehicle position by positioning and an actual vehicle position on a real road.

However, in practice, the positioning error in the vehicle position arises as shown in FIG. 3. If the recognition processing of the object is performed only at the above-mentioned timing, then there is a possibility that the vehicle already passes through the object at the time of performing the recognition processing. In such a case, the object cannot be recognized.

Since the detection of the vehicle position may be performed based on the estimated path obtained from the outputs of the GPS receiver and sensors 16-22, the positioning error of the vehicle position becomes large as the movement distance of the vehicle increases. However, if the recognition range for the above composition is set up without taking into consideration the relative relationship between the vehicle position and the object position on the running lane, there is also a possibility that even when it is determined that the detected position of the vehicle enters the set recognition range, the actual position of the vehicle does not enter the set recognition range due to the positioning error which is increased according to the movement distance of the vehicle. In such a case, the object cannot be recognized.

To obviate the problem, the object recognition system of this embodiment is arranged so that the recognition range in which the object is to be recognized is set based on the relative relationship between the vehicle position and the position of the object to be recognized and based on the positioning accuracy at the vehicle position. Specifically, in this embodiment, the recognition range is the positional range of the road which is estimated on the basis of the vehicle position detected before adjusting the vehicle position by recognizing the object by the vehicle. And the recognition range is the range in which the object can be recognized certainly if recognition processing is performed in that range even when the largest positioning error that is permitted for the detected vehicle position arises.

Next, the primary features of this embodiment will be explained with reference to FIG. 4A through FIG. 7.

Figure 4A:
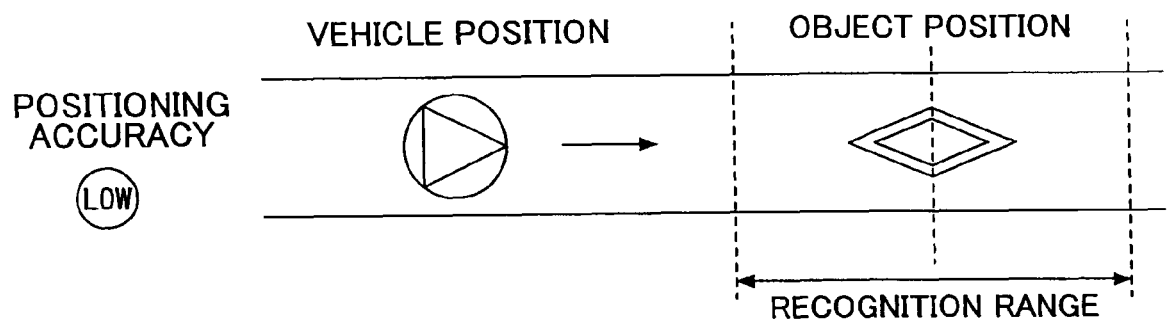
FIG. 4A and FIG. 4B are diagrams for explaining a method of setting a recognition range of a road according to the positioning accuracy of a vehicle position which may be implemented in the object recognition system of this embodiment.
Figure 4B:
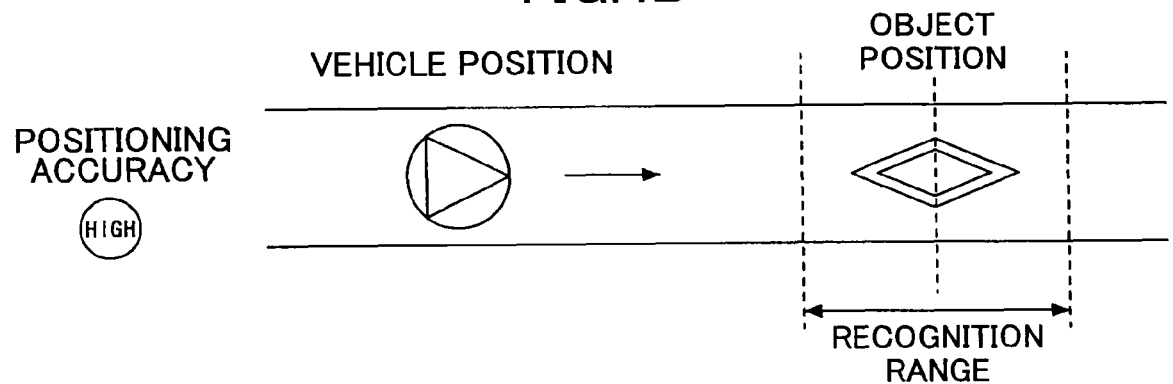
Figure 7:
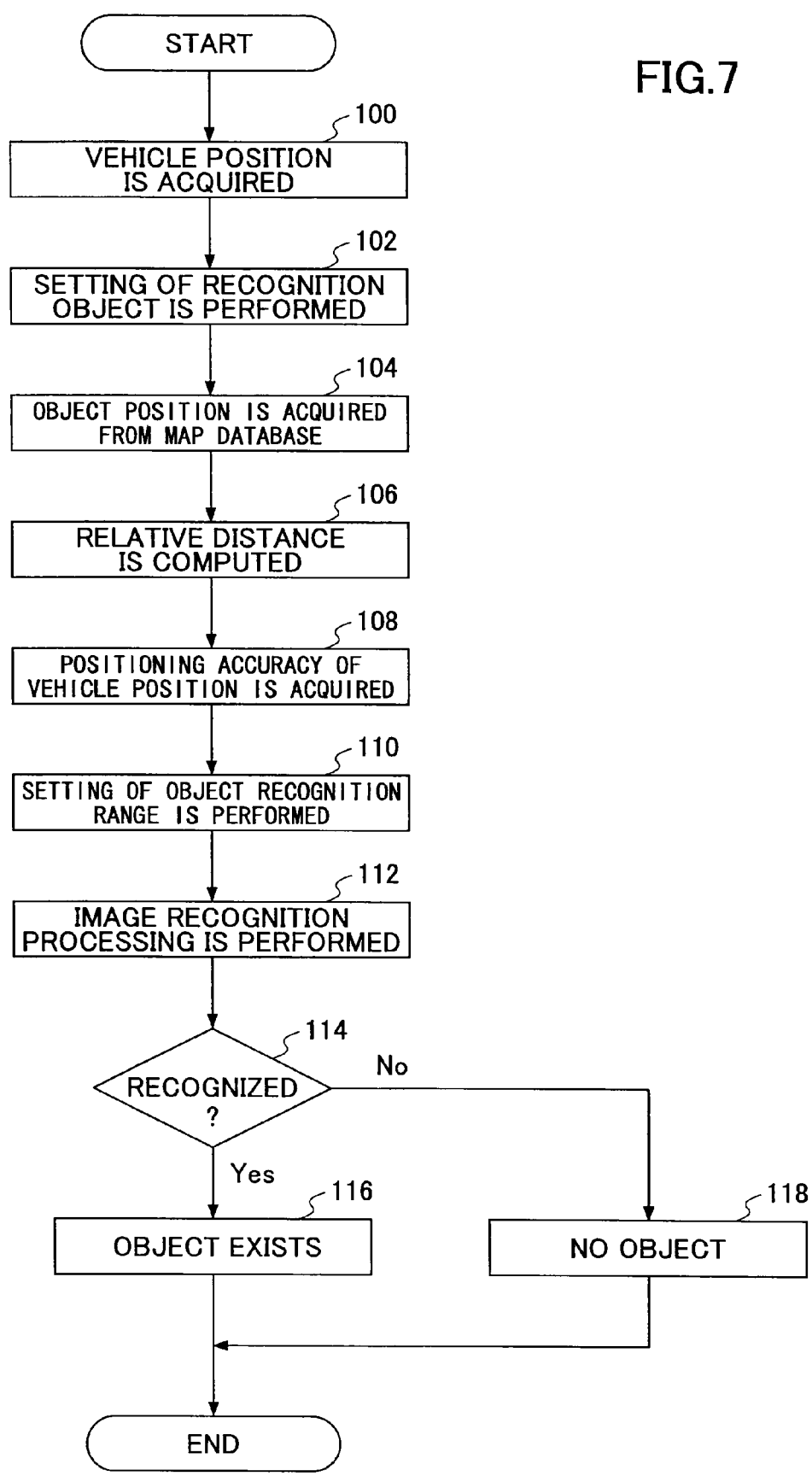
FIG. 7 is a flowchart for explaining the control processing performed by the object recognition system of this embodiment.

FIG. 4A and FIG. 4B are diagrams for explaining a method of setting a recognition range of a road according to the positioning accuracy of a vehicle position which may be implemented in the object recognition system of this embodiment. FIG. 5A and FIG. 5B are diagrams for explaining a method of setting a recognition range of a road according to the relative distance between the vehicle and the object which may be implemented in the object recognition system of this embodiment. FIG. 6 is a diagram showing a map used when setting a recognition range of a road by the object recognition system of this embodiment. FIG. 7 is a flowchart for explaining the control processing performed by the map matching part 28 in the object recognition system of this embodiment.

Generally, when the positioning accuracy of the vehicle position is very high, the detected vehicle position is accurate, the timing for the vehicle to be able to recognize the object on the real road can be grasped correctly based on the relationship between the detected position of the vehicle and the position of the object stored in the map database 30. In order to recognize the object using the captured image of the back camera 32, the recognition range of the road may be narrow for that recognition.

On the other hand, the positioning error of the vehicle position becomes large as the positioning accuracy of the vehicle position decreases. The timing for the vehicle to be able to recognize the object on the real road from such detected position cannot be grasped correctly. For this reason, in order to recognize the object using the captured image of the back camera 32, it is necessary to enlarge the recognition range of the road for that recognition (refer to FIG. 4A and FIG. 4B).

Suppose that the positioning error of the vehicle position becomes large as the movement distance of the vehicle increases. In this case, if the positioning accuracy of the vehicle position at a certain time is the same but the vehicle position at that time is far from the position of the object ahead of the vehicle on the running lane, the positioning error becomes large until the vehicle approaches the object.

For this reason, when recognizing the object using the captured image of the back camera 32, it is preferred to set a wider recognition range of the road as the relative distance (movement distance along the path) between the vehicle position and the object position on the running lane increases. It is also preferred to set a narrower recognition range of the road as the relative distance decreases (refer to FIG. 5A and FIG. 5B).

In the object recognition system of this embodiment, the map matching part 28 of the positioning part 12 detects the vehicle position based on the recognition result of the object using the captured image of the camera or based on the estimated path of the vehicle obtained using the outputs of the GPS receiver and sensors, and acquires the detected position of the vehicle (step 100).

And the map matching part 28 reads, from the map database 30, the data of all candidate objects in the road range from the vehicle position to an expected position of the vehicle which it will reach as a result of running for a predetermined time or by a predetermined distance, or to a position of a nearest target object which is a controlled system of support control to be performed, and sets the object in the road range as an object to be recognized using the back camera 32 (step 102).

It is not necessary that the objects to be recognized using the back camera 32 set from among all the candidate objects in this case are all the objects in the road range the positional data of which is stored in the map database 30. For example, they may be restricted to those existing within a predetermined distance (for example, 1 km or 700 m) from the target object of support control. Alternatively, they may be restricted to only those with a shape which can be easily specified from the captured image of the camera, those in which a deterioration of traffic indication does not arise easily, or those in conformity with the arrangement pattern according to the kind of the running road from the vehicle position to the target object of support control.

Alternatively, they may be restricted to those making the vehicle reach the target object by execution of the support control while maintaining the required positioning accuracy of the support control which will be performed by the vehicle if the object is recognized by the captured image of the camera and the vehicle position is adjusted. In this case, in order to satisfy the required positioning accuracy at the time of reaching the stop line when making the vehicle stop the stop line (which is a target object) by the stop line control, the object which exists on the running lane behind the stop line by which the vehicle position is adjusted is selected based on the required positioning accuracy for performing the support control appropriately, the current positioning accuracy, the relative distance with the vehicle, and the relative distance with the target object.

After the object to be recognized using the back camera 32 is set in the above step 102, the map matching part 28 acquires the positional data of the object to be recognized from the map database 30 (step 104). When there are a plurality of objects to be recognized which are set in the above step 102, the positional data of the nearest object to the vehicle position is acquired. And the map matching part 28 computes the relative distance of the vehicle position acquired in the above step 100 and the position of the object to be recognized acquired in the above step 104 along the running lane (step 106).

The map matching part 28 computes the current positioning accuracy when detecting the vehicle position (step 108). This computation may be performed by substituting a parameter value into a predetermined formula which is experimentally defined beforehand. For example, the initial value may be set to that corresponding to the accuracy error of GPS which is not accumulated according to the movement distance of the vehicle. It may be arranged so that the highest level of accuracy is acquired each time the vehicle position is adjusted based on the object recognition using the captured image of the camera (the second map matching). The accuracy may fall by a predetermined slope (which may be preset beforehand) according to the movement distance of the vehicle after the second map matching is performed, such that the lower the accuracy is the longer the movement distance of the vehicle is.

The map matching part 28 sets the recognition range of the road on which the object is recognized using the back camera 32, based on the relative distance between the vehicle and the object to be recognized computed in the above step 106, and based on the positioning accuracy of the vehicle position computed in the above step 108 (step 110).

In the map matching part 28, the map (as shown in FIG. 6) which is used when setting the recognition range of the road based on the relative distance of the vehicle and the object to be recognized and the positioning accuracy is stored beforehand. The map is set up so that the higher the positioning accuracy of the vehicle position is, the narrower the recognition range of the road is, while the lower the positioning accuracy is the wider the recognition range of the road is. And the map is set up so that the smaller the relative distance of the vehicle and the object to be recognized on the running lane is, the narrower the recognition range of the road is, while the larger the relative distance is, the wider the recognition range of the road is.

The magnitude of the recognition range of the road may correspond to the positioning error corresponding to the positioning accuracy. It may correspond to the largest positioning error that may arise as a result of running of the vehicle by the relative distance of the vehicle and the object to be recognized.

The map matching part 28 sets the recognition range of the road in the above step 110 by making reference to the map shown in FIG. 6.

After the recognition range of the road is set in the above step 110, the map matching part 28 compares the updated vehicle position with the set recognition range, and determines whether the vehicle position enters into the set recognition range of the road. This determination is repeatedly performed until the result of the determination is affirmative.

When it is determined that the vehicle position enters into the set recognition range of the road, the map matching part 28 decides that it is in the situation where the object should be recognized by the image processing of the captured image of the back camera 32. The map matching part 28 receives the captured image of the vehicle back from the back camera 32, and performs the image processing of the captured image, such as edge extraction, (step 112). And the map matching part 28 compares the image-processing result with the characteristic data of the object to be recognized, and performs the processing to recognize the object (step 114).

When the object to be recognized in the situation where the vehicle is located within the set recognition range of the road has been recognized as a result of the above processing in the above step 114, the map matching part 28 determines that the object to be recognized exists within the recognition range of the road (step 116). The map matching part 28 grasps the relative relation of the vehicle and the recognized object which are specified by the image processing, and performs the second map matching in which the vehicle position is adjusted to a position which matches with the relative relation to the position of the recognized object.

On the other hand, when the object to be recognized in the situation where the vehicle is located within the set recognition range of the road has not been recognized as a result of the above processing in the above step 114, the map matching part 28 determines that the object to be recognized within the set recognition range of the road does not exist (step 118). The control processing is terminated without performing the above-mentioned second map matching.

Subsequently, the map matching part 28 acquires the positional data for every object to be recognized, until the vehicle reaches the target object of the support control or its neighborhood, and sets the recognition range of the road in which the recognition processing is to be performed, and performs the above-mentioned processing.

Thus, according to the object recognition system of this embodiment, it is possible to set the recognition range of the road in which the recognition processing of the object on the road which should be recognized using the captured image of the back camera 32 should be performed, based on the positioning accuracy of the vehicle position, the vehicle position actually detected by the positioning part, and the position of object to be recognized stored beforehand in the map database 30 (or the relative distance between the vehicle and the object to be recognized on the running lane).

Specifically, the object recognition system of this embodiment is arranged to set a narrower recognition range of the road as the positioning accuracy increases, and set a wider recognition range of the road as the positioning accuracy decreases. Moreover, the object recognition system of this embodiment is arranged to set a narrower recognition range of the road as the relative distance of the vehicle and the object to be recognized on the running lane decreases, and set a wider recognition range of the road as the relative distance increases.

Moreover, the object recognition system of this embodiment is arranged to perform the recognition processing of the object using the captured image of the back camera 32 within the set recognition range of the road.

Namely, the recognition processing of the object is performed using the captured image of the back camera 32 by the object recognition system of this embodiment only when the vehicle is running in the recognition range of the road which is set up based on the relative distance of the vehicle and the object to be recognized and the positioning accuracy of the vehicle position. The recognition processing of the object is not performed when the vehicle is running in a range other than the recognition range. For this reason, according to the object recognition system of this embodiment, it is possible to reduce remarkably the load for the recognition processing of the object when compared with the load required for the existing system which invariably performs recognition processing of an object using a captured image of a back camera.

When the positioning accuracy is high, the range of the positioning error of the vehicle position is small, but it is large when the positioning accuracy is low. When the position of the vehicle is detected based on the running path of the vehicle according to the vehicle speed, the steering angle, etc., the positioning accuracy becomes low as the movement distance of the vehicle increases, and the range of the positioning error becomes large. Therefore, the object recognition system of this embodiment is arranged to set a narrower recognition range of the road as the positioning accuracy increases, and set a wider recognition range of the road as the relative distance of the vehicle and the object to be recognized on the running lane decreases. If the recognition processing of the object is not performed invariably but the timing at which the recognition processing is performed is restricted, the problem that recognizing the object to be recognized by the vehicle is impossible can be prevented, and the deterioration of the performance of object recognition can be inhibited.

After the object is recognized in the set-up road recognition range by the recognition processing in this embodiment using the captured image of the back camera 32, the second map matching which adjusts the position of the vehicle using the positional data of the object stored beforehand in the map database 30 is performed. The positional data of the object stored in the map database 30 is very accurate, and almost no error in the positional data arises. Therefore, the positional data of the object recognized from the captured image of the back camera 32 on the occasion of adjusting the vehicle position, then its adjustment to the position based on the recognized object as in the object recognition system of this embodiment will be used, it is possible to position the position of the vehicle correctly, and it is possible to raise the positioning accuracy of the vehicle position for every recognition of an object.

In the above-described embodiment, all the objects on the road to the target object by which the vehicle is about to run shortly are recognized through the image processing of the captured image of the back camera 32, and the vehicle position adjustment is performed for the result of each recognition of the objects. Alternatively, some specific objects from among all the objects may be recognized through the image processing, and the vehicle position adjustment may be performed for the result of each recognition of the specific objects.

For example, in the alternative embodiment, an object needed for securing the positioning accuracy for performing appropriately the support control which can be performed in the vehicle is selected based on the positioning accuracy required to perform appropriately the support control, the current positioning accuracy, the relative distance between the vehicle and the object, and the relative distance between the target object and the object, the selected object is recognized through the image processing, and the recognition result is determined as being the criteria when performing the vehicle position adjustment (the second map matching).

According to this alternative embodiment, the number of attempts to perform the object recognition from a captured image of a camera, and the number of attempts to perform the vehicle position adjustment based on the recognized object can be reduced. The processing load when performing the object recognition and the vehicle position adjustment can be reduced, the accuracy of vehicle position can be maintained with adequately high accuracy, and it is possible to carry out the support control according to the vehicle position appropriately.

The positioning part 12 in the above-mentioned embodiment corresponds to the object recognition device mentioned in the claims. The map database 30 which stores the positional data of an object in the above-mentioned embodiment corresponds to the storing part mentioned in the claims. The back camera 32 in the above-mentioned embodiment corresponds to the imaging part mentioned in the claims. The method of detecting a vehicle position based on the recognition result of an object using a captured image of a camera and based on the GPS and the running path of the vehicle in the above-mentioned embodiment corresponds to the predetermined method mentioned in the claims.

The positioning part mentioned in the claims is realized by the map matching part 28 which performs the step 100 in the control processing of FIG. 7 in the above-mentioned embodiment. The positioning accuracy computing part mentioned in the claims is realized by the map matching part 28 which performs the step 108 in the control processing of FIG. 7 in the above-mentioned embodiment. The recognition-range setting part mentioned in the claims is realized by the map matching part 28 which performs the step 110 in the control processing in the above-mentioned embodiment. The object recognition part mentioned in the claims is realized by the map matching part 28 which recognizes the object to be recognized for the road range set in the step 112 in the control processing in the above-mentioned embodiment. The recognized object setting part mentioned in the claims is realized by the map matching part 28 which performs the step 102 in the control processing in the above-mentioned embodiment.

In the above-mentioned embodiment, the object on a road is recognized based on the captured image of the back camera 32 arranged in the rear part of the vehicle. This invention is not limited to this embodiment. Alternatively, the object on a road may be recognized based on the captured image of a camera arranged in the front part of the vehicle or the information sent from an external infrastructure.

In the above-mentioned embodiment, setting of the recognition range of the road in which the recognition processing of the object to be recognized by using the captured image of the back camera 32 is to be performed is performed based on the positioning accuracy of the vehicle position computed at a certain time, the vehicle position being detected and the position of the object being recognized which is beforehand stored in the map database 30 (or, the relative distance between the vehicle and the object on the running lane). Once the recognition range is determined, resetting the determined recognition range is not performed even before the vehicle enters the determined recognition range. Alternatively, after the initial setting, the determined recognition range may be reset or updated during a period from the time of the initial setting to the time the vehicle enters the determined recognition range, based on the positioning accuracy of the vehicle position, the vehicle position, and the object position which are updated at respective intervals of a predetermined time.

In the alternative embodiment, the positioning accuracy falls from the time of the initial setting, but the relative distance between the vehicle and the object becomes short from the time of the initial setting, and the recognition range of the road being set up at the time of the current setting does not greatly change from that the time of the previous setting and both are almost in agreement.

When the positioning accuracy falls as the vehicle movement increases, the relative distance between the object to be recognized and the vehicle becomes short according to the movement distance. In order to realize the above-mentioned operation effectively, it is appropriate to set up the map shown in FIG. 6 so that the recognition range of the road where the recognition processing of an object is to be performed does not change so greatly before and after the above-mentioned phenomenon.

In the above-mentioned embodiment, an object on the road by which the vehicle is about to run shortly is set up as being the object to be recognized for the vehicle position adjustment. With respect to the setting of the object to be recognized for the vehicle position adjustment, the adjustment of the vehicle position in the fore-and-aft direction parallel to the running lane, and the adjustment of the vehicle position in the right-and-left direction perpendicular to the running lane may be performed independently of each other. In many cases, the kind of objects which become effective when adjusting the vehicle position in the fore-and-aft direction differs from the kind of objects which become effective when adjusting the vehicle position in the right-and-left direction. Therefore, if the setting of the object to be recognized for the vehicle position adjustment is carried out by performing the adjustment of the vehicle position in the fore-and-aft direction and the adjustment of the vehicle position in the right-and-left direction independently of each other in this way, the efficiency of performing the vehicle position adjustment can be increased and the processing load can be reduced.

In the above-mentioned embodiment, the object on the road which is recognized using the captured image of the camera is used as what is needed for the second map matching which adjusts the vehicle position based on the running path obtained according to the GPS, the vehicle speed, the steering angle, etc. The invention is not limited to this embodiment. Alternatively, for example, when the object is provided as a traffic sign on the road to indicate the zone where the entry of the vehicle is forbidden, the object recognized on the road may be used for the purposes other than the map matching, such as a warning system which outputs the in-vehicle alarm if the vehicle enters the zone.

In the above-mentioned embodiment, the map database 30 is installed in the vehicle. Alternatively, it may be installed in a center system. In the alternative embodiment, the vehicle may access the center system by telecommunications on each necessary occasion and read out the data stored in the map database in the center system.

In the above-mentioned embodiment, stop control, crossing control, vehicle speed control, and guidance control have been described as support control. Alternatively, the present invention may be applied to a system which performs another support control in accordance with the position of the vehicle.

The present application is based upon and claims the benefit of priority of Japanese patent application No. 2006-138256, filed on May 17, 2006, the contents of which are incorporated herein by reference in their entirety.

The invention claimed is:

1. An object recognition device of an automotive vehicle, comprising:
   a positioning part including a microcomputer, which detects a position of the vehicle in accordance with a predetermined method;
   a positioning-accuracy computing part including a microcomputer, which computes a positioning accuracy in detecting a position of the vehicle;
   a storing part including a storage medium or a recording medium, which stores beforehand positional information of an object on a road to be recognized by the vehicle;
   a recognition-range part including a microcomputer, which sets a recognition range of the road of the object to be recognized, based on the position of the vehicle detected by the positioning part, a position of the object stored by the storing part, and the positioning accuracy computed by the positioning accuracy computing part; and
   an object recognition part including a camera, which recognizes the object for the recognition range set by the recognition-range setting part; wherein the positioning-accuracy computing part is arranged so that a level of the position accuracy, computed at a time of adjusting of the detected position of the vehicle by the positioning part based on a recognition result of the object, decreases in accordance with an increase of a movement distance of the vehicle.

2. The object recognition device according to claim 1, wherein the recognition-range setting part is arranged to set a wider recognition range as the level of the positioning accuracy computed by the positioning accuracy computing part decreases.

3. The object recognition device according to claim 1, wherein the recognition-range setting part is arranged to set a wider recognition range as a distance from the position of the vehicle detected by the positioning part to the position of the object stored by the storing part increases.

4. The object recognition device according to claim 1, wherein, when the object is recognized for the recognition range by the object recognition part, the positioning part adjusts the detected position of the vehicle obtained from GPS or a running path of the vehicle, based on the recognition result from the object recognition part.

5. The object recognition device according to claim 1, further comprising a recognized object setting part which sets, as an object to be recognized, a specific object from among all objects positional information of which is stored in the storing part which exists on a running path of the vehicle, wherein the object recognition part is arranged to recognize only the specific object that is set by the recognized object setting part.

6. The object recognition device according to claim 1, further comprising a recognized object setting part wherein, when a support control part which performs support control of the vehicle according to a position of the vehicle requests the object recognition device to meet a required positioning accuracy during execution of the support control, the recognized object setting part sets, as an object to be recognized, a specific object from among all objects positional information of which is stored in the storing part, which specific object exists on a running path of the vehicle in which adjusting of the detected position of the vehicle by the positioning part based on the recognition result allows the positioning accuracy required by the support control part to be met during execution of the support control,
   wherein the object recognition part is arranged to recognize only the specific object that is set by the recognized object setting part.

7. The object recognition device according to claim 1, wherein the object recognition part recognizes the object using image information obtained from an image of the recognition range set by the recognition-range setting part, which image is captured by an imaging part arranged in a predetermined position of the vehicle.

* * * * *